Sept. 13, 1966 G. K. NEWELL 3,272,151
RAILWAY CAR BODY MOUNTING ARRANGEMENT
Filed July 17, 1964
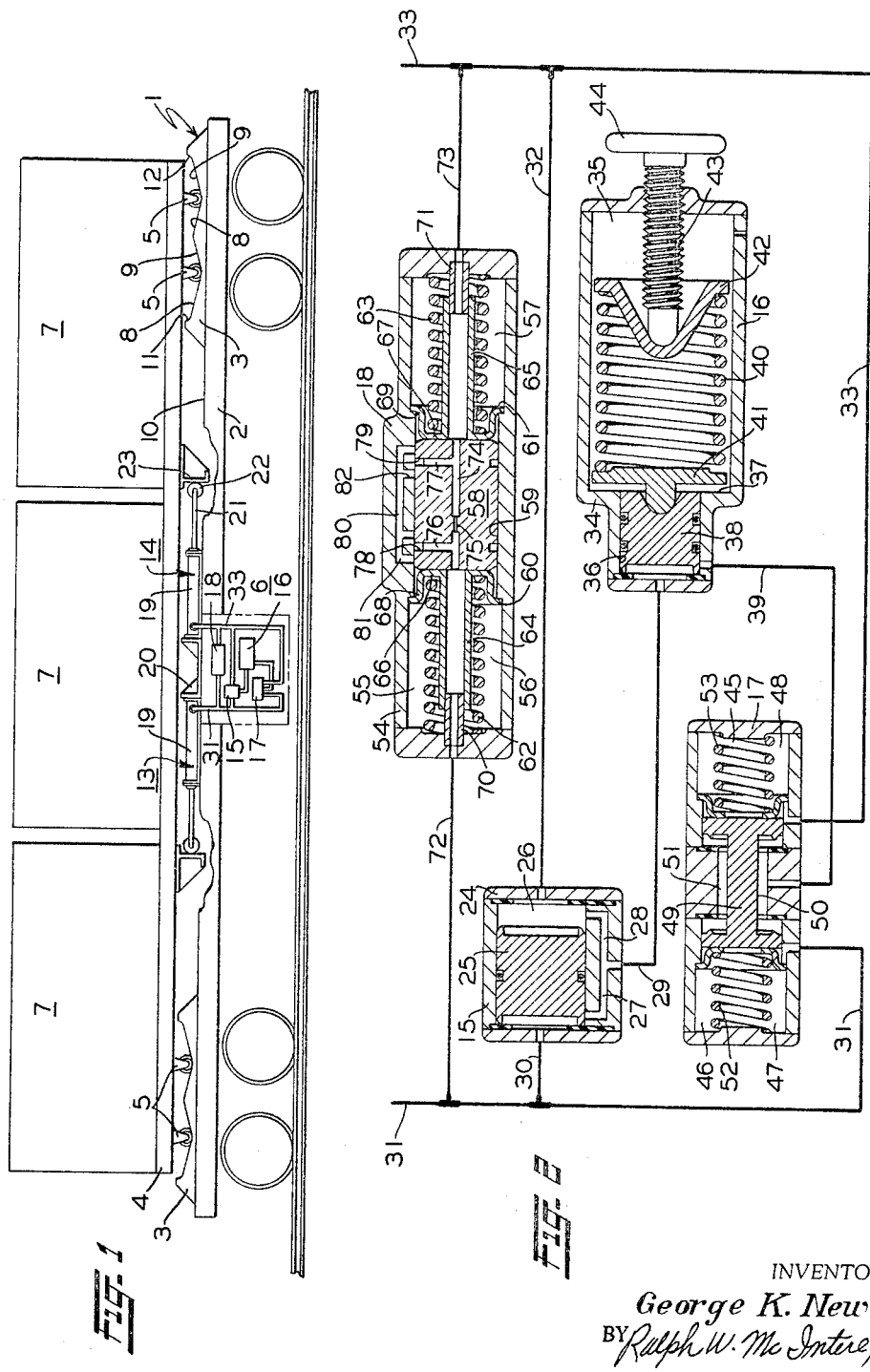
INVENTOR.
George K. Newell
BY Ralph W. McIntire, Jr.
Attorney United States Patent Office 3,272,151
Patented Sept. 13, 1966

3,272,151
RAILWAY CAR BODY MOUNTING
ARRANGEMENT
George K. Newell, Penn Township, Westmoreland County, Pa., assignor to Westinghouse Air Brake Company, Wilmerding, Pa., a corporation of Pennsylvania
Filed July 17, 1964, Ser. No. 383,366
6 Claims. (Cl. 105—392.5)

This invention relates generally to railway car body mounting arrangements, and relates particularly to such arrangements designed to absorb car impact energy to protect and minimize damage to lading.

It has long been known that longitudinal shocks to freight cars resulting from overspeed couplings during switching, and from train surges during over-the-road operation, are the causes of a major portion of all lading damage during transit.

When a standard railroad freight car is brought to a stop, the coupler acts as a high energy absorber of low cushioning capacity, absorbing enormous amounts of energy over a very short distance on the order of about six inches. For example, assuming a freight car weight of 160,000 pounds and an initial impact speed of 8 m.p.h., that is, 11.8 ft. per second per second, applying the physical law that acceleration equals the initial velocity squared divided by twice the stopping distance, there is produced a negative acceleration or deceleration of 137.5 ft. per second, that is, about 4.3 times gravity. Also, applying the physical law that force equals mass multiplied by the acceleration, we find that a retarding force of 685,000 pounds is generated within the draft gear of the car. This negative acceleration is much too high for fragile cargoes. Although the standard car body is less rigid than the standard draft gear and thus may deflect slightly on impact to effectively lengthen the cargo stopping distance by about ¼ inch, the negative acceleration of the car body decreases by about only four or five percent.

Heretofore, in attempting to reduce lading damage, a variety of energy absorbing devices, such as sliding sills on the car body, compartmentation of the car body and resilient dunnage members interposed with the lading in the cargo area, have been utilized with some success.

In general, a car equipped with a sliding center sill provides about ten inches or more of cargo travel relative to the car frame after impact, hence, in the example given above, the negative acceleration of the load upon impact is 83 ft. per second per second or about 2.56 times gravity. When a car so equipped is subjected to the aforementioned impact, tests and service experience show that only about a 50% reduction in damage to fragile loads is thereby accomplished. It has been observed that the first impact serves to compress or harden the load by sliding against the one car end and causes very little damage. However, subsequent impact in the same direction after the load is so compressed is the major cause of crushing and breakage.

Compartmentizing the lading by means of several bulkheads aids materially in reducing damage by breaking up lading inertia forces during impact. Such bulkheads, however, are disadvantageous in that they must be very sturdy, yet easily adjustable into position and secured with a dependable locking device. Moreover, such devices add materially to loading time and other complications during loading.

In a car equippped with inflated dunnage members for lading control, the compartmentizing of the cargo area by several inflated bladders is effective only so long as the number of impacts is insufficient to drive the lading all to one end of the car. In normal operation, successive motion of the lading tends to squeeze some of the air out of the head end bladders and transfer it to those at the rear, thus the head end cushions become less and less effective until they can no longer protect the head end portion of the lading. Further, there is little or no force available after impact to recenter the cargo.

It seems to be the general experience that shocks of up to 1.75 times gravity are not damaging to so-called fragile cargoes, such as cans or bottles in cartons, clay tile and the like, particularly where compartmentized loads were concerned. It also appears that limitation of load acceleration to this low value is not being accomplished during impacts above 5 m.p.h. car velocity by any of the present cushioning means.

The problem, then, is to limit lading shock to about 1.75 times gravity for all normally expected impact speeds.

Accordingly, it is an object of this invention to provide in railway cars a novel impact energy absorbing means for limiting lading shock to a predetermined maximum at higher impact speeds than heretofore possible by the use of any present cushioning means to protect fragile cargoes.

In achieving this object, it appears that the most satisfactory solution to the problem of reducing lading shock may be obtained when the cushioning or shock absorbing means are applied directly to the lading, that is, between the car body and the cargo.

More particularly, in the present invention, dissipation of the kinetic energy of lading shock is effected partially by disposing the load on a wheeled platform disposed to roll upon longitudinal tracks having a hill and valley contour in the longitudinal direction of movement of the car, whereby upon impact the load is caused to do work against gravity by rolling up an incline formed by the tracks, and partially by the automatic application of a predetermined retarding force of sufficient magnitude to slow and stop the load within a proportionate space of travel, as provided by a fluid pressure system having valve means. Moreover, the load is disposed to automatically roll back down the incline, after the kinetic energy of impact is dissipated, under the control of a predetermined retarding force supplied by the pressure system, to thus recenter the load within the car to prevent hardening of the load at the impact end of the car, thereby readying the car for subsequent impact either in the same or opposite direction.

These and other objects will become more readily apparent when taken in conjunction with the following description and the drawings in which:

FIG. 1 is a side elevational view of a railway car embodying the present invention, and FIG. 2 is an enlarged schematic diagram of a portion of the fluid pressure system shown in FIG. 1.

Referring to FIG. 1 of the drawing, there is shown a railway car generally indicated at 1 and comprising a wheeled body 2 supporting a pair of track means generally indicated at 3, 3 and disposed near the opposite ends of the floor of the car body, a carriage or platform shorter than the car body and generally indicated at 4 and having wheeled means 5, 5 extending downwardly at each end thereof and disposed in rolling engagement with the track means, a fluid pressure system generally indicated at 6 and disposed between the car body 2 and the platform 4 for automatically providing a predetermined retarding force upon the platform relative to movement thereof with respect to the body, and lading containers 7, 7, 7 removably fixed upon the top of the platform by any suitable locking means (not shown).

A plurality of wheeled means 5 comprising standard flanged wheels may be disposed longitudinally of the platform, with two such wheel devices being shown at each end of the car body 2 in this embodiment. It is to be understood that, depending upon the width of the individual wheels, each of the wheeled means 5 may comprise one or more wheels disposed laterally of the car, as desired, depending upon the support desired. In any event, each wheel means is normally disposed in a valley on track means 3, which valley is formed at the intersection between two track portions 8 and 9 which are equally and oppositely inclined relative to the floor 10 of the car body 2, so that a series of such portions gives rise to a hill and valley side elevational contour of the track means 3, as shown. The ends 11 and 12 of each track means 3 are sharply inclined substantially vertically to comprise limit means engageable by the wheel means, respectively.

When each wheeled means 5 is being pushed up the inclined track portions 8 or 9 in response to acceleration of the car body 2, depending upon the direction of the impact force, it is opposed by a force component of gravity equal to W sine A, where W is the wheel load and A is the angle of inclination. Thus, for example, if the inclination is 15 degrees, the opposing force is 0.259 W pounds. Therefore, as the platform continues to move at its initial velocity at the time of impact, a retarding force of .259 W pounds will be applied to the platform 4 as it rolls up the inclined track to steadily slow the platform at a negative acceleration of .259 times gravity. The inclined portions 8, 9 of the track may be of sufficient length relative to the angle of inclination so that the platform will come to a stop of its own accord. However, inasmuch as the length of the platform 4 must be shorter than the car body 2 to allow longitudinal movement of the platform relative thereto, the longer the required length of track, the shorter the platform must be to prevent interference between adjacent cars, thus limiting the cargo space on the platform.

An important aspect of the above-described utilization of an incline to provide a component of gravity for slowing the platform 4 and its load 7 resides in the fact that any negative acceleration provided by a component of gravity equally affects every particle of a load, which, in this instance, comprises the platform 4 and load 7, so that in this means of slowing the platform and its load after impact, there is no tendency for the load 7 to slide relative to the platform 4.

This being the case, the aforementioned fluid pressure system 6 is utilized to provide an additional external retarding force of 1.75 times gravity, the aforementioned maximum negative acceleration which can be utilized without damaging fragile cargo. This externally applied force, taken with the retarding force of gravity in the aforementioned example, combines to produce a total negative acceleration of about two times gravity, but only the externally applied retarding force provided by the fluid pressure system 6 would tend to cause sliding of the load 7 on the platform 4. The application of an additional retarding force by the fluid pressure system 6 permits the use of a shorter track 3 to thus permit a correlative lengthening of the platform 4 to increase the cargo space.

The fluid pressure system 6, shown generally in FIG. 1 and in more detail in FIG. 2, is mounted upon the car body 2 and comprises opposed buffing cylinder means 13 and 14 individually responsive to opposite relative movement between the car body 2 and the platform 4, and a system of piping and suitable valve devices, first, for providing a build-up of pressure in whichever one of the cylinder means is under buff for exerting a suitable predetermined retarding force upon the platform 4 and load 7, upon impact; second, to transfer fluid under pressure pressed out of the buffing cylinder device by load motion into the opposite free cylinder device, and third, to redistribute the fluid equally in both banks of cylinders after the impact and for retarding acceleration of the load as it recenters itself on the car by descending to the track valleys.

The valve devices generally comprise a double check valve 15, a pressure limiting valve 16, and a second double check valve 17 interconnected with each other and the cylinder means 13, 14 for providing the predetermined retarding force through the cylinder means under buff after impact. In addition, a snubber valve 18 intercommunicates the cylinder means 13 and 14 for providing a retarding force upon the platform during the load recentering operation after impact.

Each of the cylinder means 13, 14 may comprise one or more cylinders 19 (only one shown) disposed laterally of the car body 2 and attached to the car floor 10 by any suitable means, such as a bracket 20. A piston (not shown) is disposed in each cylinder and is attached to one end of a piston rod 21 extending through one end of a cylinder and having a wheel 22 on the other end thereof disposed in rolling engagement with a vertically disposed track member 23 attached to and extending downwardly from the bottom of the platform 4, so that as the platform rises during movement thereof up the inclined track 3, the force acting on the piston rod as provided by the platform remains axially of the piston rod by virtue of the wheel 22 rolling upon the track 23.

The double check valve 15 comprises a casing 24 having a shuttle valve 25 reciprocably disposed in a cavity 26 therein to alternately open and close each of a pair of spaced passages 27, 28 communicating the cavity with a single outlet pipe 29 in response to predominant pressure in one end of the cavity over that in the other end of the cavity as provided by branch pipe 30 of main passage 31 communicating with cylinder device 13 and branch pipe 32 of main passage 33 communicating with cylinder device 14.

The pressure limiting valve 16 is disposed to pass fluid under pressure from the double check valve 15 to double check valve 17 only when the pressure in whichever cylinder device 13, 14 is under buff builds up to equal a predetermined pressure calculated to provide the desired retarding force upon the platform 4. The pressure limiting valve comprises a casing 34 including therein a cavity 35 having a necked end 36 forming a shoulder 37 on the wall of the cavity. A valve member 38 is reciprocably disposed in the necked cavity portion 36 for movement away from the end of the necked cavity end 36 in response to pressure therein as provided by pipe 29 communicating therewith through the casing to thus communicate output pipe 39 with pipe 29. In order to prevent valve 38 from communicating pipe 39 with pipe 29 until pressure has built up to a predetermined level, a coil spring 40 is disposed in cavity 35 in compressed condition between a first spring retainer 41 abutting valve 38 and a second spring retainer 42 disposed in the cavity 35 and movable with respect to the casing 34 by means of an adjustable screw 43 axially threaded through the opposite end of the casing 34 and having an end wheel 44 on the end thereof for adjusting the compression of spring 40 to provide a predetermined force upon valve member 38.

The second double check valve 17 is disposed to direct the fluid flow from the pressure limiting valve 16 to whichever one of the cylinder devices 13 and 14 is not under buff during a negative acceleration, to ready the same for providing a retarding force on the load platform 4 during the subsequent load recentering operation. The check valve includes a casing 45 having a cavity 46 therein divided into a pair of chambers 47, 48 by a valve member 49 reciprocably movable therein, the chambers 47, 48 communicating with main pipes 31, 33, respectively, when the valve member is centrally disposed. The valve member 49 is centrally necked at 50 providing a chamber 51 communicated with pipe 39 for receiving fluid as passed thereto by the above-described fluid pressure limiting valve 16. A pair of coil springs 52, 53 are disposed in chambers 47, 48, respectively, in opposed relationship to bias the valve member 49 to the central position, as shown. In the operation of the valve, a predominant pressure in either main passage 31 or 33 over the other provides a predominant pressure in either of chambers 47 or 48 relative to each other to move valve member 49 one direction or the other for communicating chamber 51 with the main passage 31 or 33 having the lower pressure, to direct fluid to the cylinder device 13 or 14, whichever is not under buff.

The snubber valve 18 is disposed between cylinder devices 13, 14 to provide a predetermined retarding force upon the platform 4 during the load recentering operation, and includes a casing 54 having a cavity 55 therein divided into a pair of chambers 56, 57 by a reciprocably movable valve member 58 disposed in a centrally located necked portion 59 of the cavity, the necked portion forming a pair of opposed shoulders 60, 61. The valve member 58 is biased to a central position by a pair of springs 62, 63 coaxially aligned and in engagement therewith in chambers 56, 57, respectively, each spring encircling the coaxially disposed tubular shafts 64, 65, respectively, of spring retainers 66, 67, respectively, disposed between the corresponding end of the valve member 58 and the corresponding spring end, each retainer having a lip portion 68, 69, respectively, engageable with the corresponding shoulders 60, 61, respectively. The springs provide a predetermined force upon the valve member 58 to thus determine the amount of retarding force to be applied to the recentering load, as hereinafter described. The shafts 64, 65 serve as passages for fluid and to this end are slidably sleeved at their remote ends over pipes 70, 71, respectively, which pipes are coaxially disposed therewith and extend through the corresponding ends of the casing 54, and are communicated with main passages 31, 33, respectively, by way of branch pipes 72, 73, respectively. The valve member 58 is provided with a passage 74 extending therethrough coaxially with tubular shafts 64, 65, and which is centrally provided with a restriction 75 comprising a pressure equalizing bleed choke between cylinder devices 13 and 14, as hereinafter described. The passage 74 is provided with a pair of spaced branch passages 76, 77 straddling the choke 75 and extending perpendicularly of passage 74 through one side of valve member 58 to peripheral grooves 78, 79, respectively. The branch passages 76, 77 are communicated with one another by way of a passage 80 in the casing wall when the valve member is moved to the right of the centralized position, as shown, under the force of fluid in main passage 31, and are communicated by way of branch passages 81, 82 of passage 80 when the valve member 58 is moved to the left from the centralized position under the force of fluid in main passage 31. In the operation of the snubber valve 18, when the fluid pressure in either end of the valve 58, as provided by pipes 72 or 73, builds up to exceed the force of compression of the opposite spring, the valve member will move in the direction of the force applied, thus communicating tubular shafts 64, 65 with one another by way of passage 80 or branch passages 81, 82 to transfer fluid to the other shaft and thus prevent a buildup of pressure greater than that of the opposing spring, whereby the retarding force as provided by the buffing cylinder 13 or 14 may not exceed a predetermined amount and thus constitute a constant retarding force during recentering of the load.

In describing the operation of the fluid pressure system 6, it is assumed that in the example given above the car is loaded with cans or bottles in cartons weighing 55,000 pounds, a normal weight for such material. The retarding force due to gravity on the 15 degree inclined track 3 is 55,000 times .259, which equals 14,250 pounds. The additional external retarding force necessary to produce a negative acceleration of 1.75 times gravity is 55,000 times 1.75 which equals 96,000 pounds. The total retarding force is then 14,250 plus 96,000, which equals 110,250 pounds, and the total negative acceleration is two times gravity. It is further assumed that an impact occurs when the car is traveling at ten m.p.h. whereupon it strikes a string of cars which are bunched. This condition is substantially the most severe that could occur without causing major damage to the car itself. Under these conditions, the necessary stopping distance for the load platform 4 is 14.67 times 14.67/2×2×32.2, which equals 1.67 ft.

To achieve the above retarding force, the hydraulic cylinder devices need to provide a total retarding force of 96,000 pounds. A conservative value for hydraulic fluid pressure of 1,000 p.s.i. would require a total buffer cylinder area of 96 sq. in. This would be equivalent to a bank of two eight in. cylinders. Two such banks would be required, one for each possible direction of impact. Accordingly, in this example, each of the cylinder devices 13 and 14 comprises two such cylinders of the values given.

Assuming an impact at the left end of the car 1, the lading 7 will tend to move leftward. The fluid in cylinder device 14 is placed under a pressurized condition as the platform 4 rolls to the left upon track 3, whereupon piston rod 21 is moved to the left under the force of track member 23 acting upon piston rod 21. The fluid under pressure in cylinder device 14 transfers pressure through main passage 33 and branch pipe 32 to move the shuttle valve 25 in double check valve 15 to the left to close branch pipe 30 of main passage 31 thereby cutting off direct communication with the cylinder device 13, and at the same time opening passage 28 to pass fluid through outlet pipe 29 to the pressure limiting valve 16. At the same time, fluid under pressure is provided through main passage 33 to the right end of the double check valve 17 to provide a fluid pressure in chamber 48 therein effecting leftward movement of the valve member 49 to seal off chamber 48 and to provide communication of output pipe 39 from the pressure limiting valve 16 with chamber 51 and main passage 31 leading to the cylinder device 13. Fluid under pressure will then pass from double check valve 15 through outlet pipe 29 to the pressure limiting valve 16 in which the coil spring 40 has been previously adjusted by means of end wheel 44, adjustable screw 43 and spring retainer 42 to provide a biasing force of 1,000 p.s.i. upon the valve member 38 to hold the same in the position shown. Subsequent leftward motion of piston rod 21 in cylinder device 14 then forces fluid under pressure through the pressure limiting valve 16 by effecting rightward movement of the valve member 38 therein to provide fluid under pressure through output pipe 39, chamber 51 in double check valve 17 and main passage 31 to the cylinder device 13. Thus, movement of the platform 4 upon the inclined track portion 8 of track means 3 is resisted by the operation of the fluid pressure system 6 which provides a constant fluid pressure for producing a predetermined retarding force upon the load until the load is stopped relative to the car body in a position at or near the top of the inclined track portions 8 of the track means 3.

Inasmuch as the aforementioned 1,000 p.s.i. fluid pressure is built up in cylinder device 14 almost instantly upon impact, the floating valve member 58 in snubber valve 18 responds to this pressure thereon as provided through main passage 33 and branch pipe 73, pipe 71, tubular shaft 65 by moving quickly to the left, thus passing branch passages 81 and 82 of passage 80 so quickly that the passage of any considerable quantity of fluid therethrough is relatively negligible. Accordingly, during the absorption of impact energy, the snubber valve 18 is ineffective and remains so during the application of the retarding force as provided by the fluid pressure system 6.

At this point, if the fluid pressure relationships are correct, all the momentum of the lading will have been dissipated and the only problem remaining is to control the motion of the load 7 and platform 4 as it starts to roll back down the inclined portions or ramps 8 to the bottom of the ramp at the intersections between the inclined track portions 8 and 9. If the platform 4 is permitted to roll uncontrolled, the accelerating force in this example would be 14,250 pounds as before, except that during the roll down motion, this force would be acting in the direction of motion. Under these conditions, the acceleration is .259 times gravity or 8.35 ft. per second per second. At the bottom of the ramp, that is, at the intersection between inclined track portions 8 and 9, the velocity would be 5.27 ft. per second, which velocity is much too fast for effective lading protection. Accordingly, the pressure system 6 is designed to provide a retarding force during roll down of the platform 4, as herein after described.

After the kinetic energy of impact has been dissipated in the aforementioned manner, fluid pressure in the fluid pressure system 6 is momentarily relieved, and then begins to build up in the cylinder device 13 as the platform 4 and load 7 thereon starts back down the inclined portions 8 of track means 3 in a rightward direction, to recenter the load. Since this recentering movement is much slower than the movement of the load and platform thereof in response to impact, the snubber valve springs 62 and 63 may now serve to limit fluid pressure and to effect bypass of fluid through the valve as this pressure tends to be exceeded, thus slowly lowering the load down the ramp.

With a total buffing cylinder area of 96 square inches for each of the cylinder devices 13 and 14, as discussed above, a fluid pressure of 14,250/96, which equals 149 p.s.i., will hold the load against movement in the roll down direction. However, inasmuch as roll down is desirable and necessary for recentering of the load, an appropriate retarding force is necessary to limit the final velocity of the platform 4 and load 7 to a maximum of 1 ft. per second. This final velocity would require an acceleration not exceeding 0.3 ft. per second per second and a net accelerating force downhill of the track portion 8 of only 465 pounds. Accordingly, a retarding force of 14,250—465, which equals 13,785 pounds, is necessary to achieve this result. In the 96 sq. in. buffing cylinder area, this would amount to 13,785/96 or 143.5 p.s.i.

Accordingly, in the snubber valve 18, each of the springs 62 and 63 are compressed to provide a predetermined force of 143.5 pounds per sq. in. of piston valve area. Thus, as the platform 4 rolls down the inclined track portion 8, the piston in cylinder device 13 is moved to the right providing fluid pressure in main passage 31 and branch pipe 72 through pipe 70, tubular shaft 64 to act upon valve member 58, whereupon, when a pressure of 143.5 pounds is achieved thereon, the snubber valve 18 is centered, as shown. When this pressure is exceeded the valve member 58 is moved to the right, compressing spring 63 to communicate the left end of passage 74 in valve member 58 with the right end of passage 74 in bypass of the choke 75 by means of branch passages 76, casing passage 80, branch passage 77 and tubular shaft 65 to pass fluid from cylinder device 13 to the cylinder device 14. It is seen that this action of the snubber valve springs 62, 63 serves to limit fluid pressure to the desired amount by bypassing fluid as this pressure tends to be exceeded, thus slowly lowering the load 7 on platform 4 down the track means 3. At the same time, during the roll down operation, pressure is provided through main passage 31 and branch pipe 30 to double check valve 15 for effecting a rightward movement of shuttle valve 25 to close off branch pipe 32 to render ineffective the double check valve 15, the pressure limiting valve 16 and the double check valve 17 during this portion of the operation. The platform 4 is now recentered in the original position and is prepared for a subsequent impact upon either end of the car 1.

In the event the lading weight should vary materially from the 55,000 pounds as set forth in the above example, the acceleration of the platform 4 and load 7 may be held at a limit of two times gravity by increasing the compression upon the coil spring 40 in the pressure limiting valve 16 for heavier loads, or decreasing the compression of coil spring 40 for lighter loads. If desired, a calibrated spring force dial (not shown) could be installed on the pressure limiting valve.

As set forth above, a travel of about 2 ft. either way from the central position is required for the platform 4 and loads 7, which travel of course represents lost lading space. However, inasmuch as a number of inflated dunnage bag members probably would occupy an equal space, and lading bulkheads, if sufficiently sturdy, would occupy almost the same space, actual lading space is not reduced inasmuch as the present invention eliminates the need for these accessories.

Replenishment of oil lost due to leakage of the fluid pressure system is not a problem because the oil is under no pressure when the system is at rest, and a filling plug (not shown) may easily be provided at a convenient high point, such as on the buffer cylinder devices 13, 14.

Having now described the invention, what I claim as new and desire to secure by Letters Patent, is:

1. A vehicle body mounting arrangement for absorbing impact energy to protect lading therein, comprising:
   (a) a vehicle body,
   (b) means for carrying cargo,
   (c) guide means on said body extending longitudinally of the forward and reverse directions of travel of said body, and having at least portions thereof inclined with respect to the direction of travel, the inclined portions being linear and intersecting at their lower points comprising stop means,
   (d) means on said first named means engageable with said guide means and normally positioned by the weight of the first named means at said low point of said inclined portions and movable along the inclined portions for providing a component of gravity as a retarding force for relative movement between said body and said first named means when said body is accelerated, and
   (e) means operable to provide a predetermined force for opposing the weight of the cargo carrying means for retarding movement of said cargo carrying means down said inclined portions to limit the force of impact of said means engageable with said guide means with said stop means to a value less than a cargo damaging impact force when relative movement between said vehicle and said cargo carrying means has ceased after an acceleration of said vehicle body.

2. A vehicle body mounting arrangement for absorbing impact energy to protect lading therein, comprising:
   (a) a vehicle body,
   (b) means for carrying cargo,
   (c) guide means on said body extending longitudinally of the forward and reverse directions of travel of said body, and having at least portions thereof inclined with respect to the directions of travel, the inclined portions being linear and intersecting at their low points comprising stop means,
   (d) means on said first named means engageable with said guide means and normally positioned by the weight of the first named means at said low point of said inclined portions and movable along the inclined portions for providing a component of gravity as a retarding force for relative movement between said body and said first named means when said body is accelerated,
   (e) means for applying a predetermined force cooperating with said component of gravity for retarding movement of said cargo carrying means up said inclined portions with respect to said vehicle body when said body is accelerated, and
   (f) means operable to provide a predetermined force less than said first-mentioned predetermined force for opposing the weight of the cargo carrying means for retarding movement of said cargo carrying means down said inclined portions to limit the force of impact of said means engageable with said guide means with said stop means to a value less than a cargo damaging impact force when relative movement between said vehicle and said cargo carrying means has ceased after an acceleration of said vehicle body.

3. In a vehicle, the combination as recited in claim 2, further characterized in that said means for retarding movement of said cargo carrying means up said inclined portion and said means for retarding movement of said cargo carrying means down said inclined portion comprises a fluid pressure means.

4. A vehicle body mounting arrangement for absorbing impact energy to protect lading therein, comprising:
   (a) a vehicle body,
   (b) means for carrying cargo,
   (c) means for mounting said first named means on said body for relative movement with respect thereto in each direction of forward or reverse travel of said body when said body is accelerating, and
   (d) fluid pressure means disposed on said body and operable in response to movement of said first named means relative to said body to provide a predetermined constant movement retarding force on said first named means, said fluid pressure means comprising:
      (i) a pair of cylinders on said body, one cylinder for each direction of travel of said cargo carrying means, and each including a piston rod engageable with said cargo carrying means to force fluid under pressure out of the cylinder corresponding to the direction of travel in which said cargo carrying means moves with respect to to said body,
      (ii) means including fluid pressure limiting valve means for passing fluid from whichever of said pair of cylinders is under buff to the remaining cylinder only while the pressure in said cylinder under buff exceeds a predetermined pressure,
      (iii) said last named means including:
         (1) a double check valve means communicating with said cylinders to provide fluid under pressure to an output from whichever one of said cylinders is under buff,
         (2) said fluid pressure limiting valve means having an input communicated with the output of said double check valve means and operable in response to pressure at said input above a predetermined value to communicate said input with an output of said fluid pressure limiting valve means, and
         (3) second double check valve means operable in response to whichever one of said cylinders is under buff to communicate said pressure limiting valve output means with the remaining cylinder for providing fluid thereto.

5. A fluid pressure system for providing a retarding force to a member movable with respect thereto, comprising:
   (a) a pair of cylinder means having piston rods and adapted to be disposed in opposed fixed position upon a common support,
   (b) said piston rods adapted for engagement with said member movable with respect thereto in opposite directions corresponding to the directions of movement of said piston rods,
   (c) a double check valve means having inputs communicating with said cylinder means and having an output,
   (d) a pressure limiting valve means having an input communicating with said output and operable in response to fluid pressure above a predetermined value at said output to communicate said output with an output of said pressure limiting valve means, and
   (e) a second check valve means operable in response to predominant fluid pressure in either of said cylinder means to communicate the output of said pressure limiting valve to the other cylinder means.

6. A vehicle body mounting arrangement for absorbing impact energy to protect lading therein, comprising:
   (a) a vehicle body,
   (b) means for carrying cargo,
   (c) guide means on said body and means on said cargo carrying means engageable therewith and movable therealong to provide relative movement between said body and said cargo carrying means from a center position in each direction of forward and reverse travel of said body when said body is accelerating, and
   (d) means operable in response to movement of said cargo carrying means relative to said body when said body is accelerating for stopping movement of said cargo carrying means at an acceleration no greater than a predetermined maximum permissible acceleration without damaging cargo and to effect recentering of said cargo carrying means after movement thereof is stopped at an acceleration less than said cargo damaging acceleration, said means for stopping movement of said cargo carrying means comprising:
      (i) portions of said guide means inclined with respect to each direction of travel of said body to provide a component of gravity for effecting retardation of the acceleration of said cargo carrying means relative to said body when said body is accelerating, and
      (ii) a fluid pressure means on said body and engageable with said cargo carrying means and operable in response to relative movement therebetween to provide a first force opposing said movement to retard acceleration of said cargo carrying means relative to acceleration of said body, and for providing a force opposing the weight of said car during a recentering operation after cessation of acceleration of the car body to retard acceleration of the cargo carrying means to a predetermined value for lessening lading shock,
      (iii) said fluid pressure means comprising:
         (1) a pair of cylinders on said body, one of said pair of cylinders corresponding to each direction of travel for each direction of forward and reverse travel of said cargo carrying means and including a piston rod engageable with said cargo carrying means to force fluid under pressure out of whichever one of said cylinders is under buff when said cargo carrying means moves with respect to said body during acceleration of said body,
         (2) means including fluid pressure limiting valve means for passing fluid from whichever one of said pair of cylinders is under buff to the remaining cylinder of said pairs only while the pressure in said cylinder under buff exceeds a predetermined pressure, and
         (3) means connected between said pairs of cylinders and operable only during the cargo carrying means recentering operation to pass fluid from the cylinder under buff during the recentering operation to the remaining cylinder only when said pressure exceeds a predetermined pressure for providing a retarding force upon said cargo carrying means as it is recentered by movement down said inclined portions of said track means to the said center position.

(References on following page)

References Cited by the Examiner

UNITED STATES PATENTS

| | | | |
|---|---|---|---|
| 569,094 | 10/1896 | Dunlop | 105—454 |
| 1,388,247 | 8/1921 | Evans | 105—368 |
| 1,495,130 | 5/1924 | Bremerman | 105—368 |
| 2,047,955 | 7/1936 | Fitch | 105—392.5 |
| 2,585,126 | 2/1952 | Holland | 105—368 |
| 2,973,174 | 2/1961 | Stanwick et al. | 105—454 X |
| 3,003,436 | 10/1961 | Peterson | 105—454 |
| 3,079,897 | 3/1963 | Kirsch | 105—392.5 |

ARTHUR L. LA POINT, *Primary Examiner.*

D. E. HOFFMAN, *Assistant Examiner.*